US012603004B2

(12) United States Patent
Unno et al.

(10) Patent No.: US 12,603,004 B2
(45) Date of Patent: Apr. 14, 2026

(54) WARNING DEVICE

(71) Applicant: ISUZU MOTORS LIMITED, Tokyo (JP)

(72) Inventors: Masahide Unno, Fujisawa (JP); Masafumi Kubota, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 273 days.

(21) Appl. No.: 18/041,812

(22) PCT Filed: Aug. 25, 2021

(86) PCT No.: PCT/JP2021/031155

§ 371 (c)(1),
(2) Date: Feb. 16, 2023

(87) PCT Pub. No.: WO2022/045192

PCT Pub. Date: Mar. 3, 2022

(65) Prior Publication Data

US 2024/0029565 A1 Jan. 25, 2024

(30) Foreign Application Priority Data

Aug. 31, 2020 (JP) ................................ 2020-145357

(51) Int. Cl.
*G08G 1/16* (2006.01)
*G08G 1/01* (2006.01)
*G08G 1/052* (2006.01)

(52) U.S. Cl.
CPC ........... *G08G 1/161* (2013.01); *G08G 1/0141* (2013.01); *G08G 1/052* (2013.01); *G08G 1/166* (2013.01)

(58) Field of Classification Search
None
See application file for complete search history.

(56) References Cited

U.S. PATENT DOCUMENTS 5,844,522 A * 12/1998 Sheffer ................ G08B 25/009 340/8.1
6,326,903 B1 * 12/2001 Gross ..................... G08G 1/087 340/988

(Continued)

FOREIGN PATENT DOCUMENTS

CN 104221066 A 12/2014
CN 105513420 A 4/2016

(Continued)

OTHER PUBLICATIONS

International Search Report of PCT/JP2021/031155 dated Nov. 16, 2021.

*Primary Examiner* — Redhwan K Mawari
*Assistant Examiner* — Kai Wang
(74) *Attorney, Agent, or Firm* — Shih IP Law Group, PLLC

(57) ABSTRACT

A warning device includes: a right turn determining part that determines that a vehicle will turn right if a turn signal thereof is in a right turn signal state, and vehicle speed thereof is equal to or less than creep speed; an oncoming vehicle approach determining part that determines that another vehicle is approaching the vehicle as an oncoming vehicle if the vehicle will turn right, a vector indicating a travel direction of the vehicle and a vector indicating a travel direction of the other vehicle intersect with each other, and a position of the other vehicle is included in a predetermined angle range in front of the vehicle; and an output control part that causes a warning to be output if the other vehicle is approaching the vehicle, and a yaw rate of the vehicle is equal to or greater than a predetermined angular velocity.

20 Claims, 6 Drawing Sheets

(56) References Cited

U.S. PATENT DOCUMENTS

| | | | | |
|---|---|---|---|---|
| 9,852,633 | B2 * | 12/2017 | Igarashi | B60W 30/0956 |
| 10,242,272 | B2 * | 3/2019 | Spampinato | G06V 40/20 |
| 10,607,490 | B2 * | 3/2020 | Ikedo | B60Q 9/008 |
| 2003/0080877 | A1 * | 5/2003 | Takagi | H04N 7/181 348/E7.086 |
| 2005/0143889 | A1 * | 6/2005 | Isaji | G08G 1/161 701/80 |
| 2007/0282530 | A1 | 12/2007 | Meister et al. | |
| 2010/0222957 | A1 * | 9/2010 | Ohta | B60K 35/81 701/31.4 |
| 2014/0145861 | A1 | 5/2014 | Goudy et al. | |
| 2015/0032362 | A1 * | 1/2015 | Goudy | B60W 30/095 701/301 |
| 2015/0046038 | A1 | 2/2015 | Kawamata et al. | |
| 2015/0369614 | A1 * | 12/2015 | Watanabe | G01C 21/26 701/468 |
| 2016/0101731 | A1 | 4/2016 | Matsuoka | |
| 2016/0185348 | A1 | 6/2016 | Miura | |
| 2016/0335897 | A1 | 11/2016 | Naserian et al. | |
| 2017/0072852 | A1 * | 3/2017 | Matsuoka | G08G 1/164 |
| 2017/0113683 | A1 * | 4/2017 | Mudalige | B60W 30/0956 |
| 2017/0158127 | A1 | 6/2017 | Akiyama et al. | |
| 2018/0059686 | A1 | 3/2018 | Liu et al. | |
| 2018/0102054 | A1 | 4/2018 | Naserian et al. | |
| 2018/0114443 | A1 | 4/2018 | Mukai et al. | |
| 2018/0172825 | A1 * | 6/2018 | Hsu | G01S 7/411 |
| 2019/0071071 | A1 | 3/2019 | Yamada et al. | |
| 2019/0180623 | A1 | 6/2019 | Lee et al. | |
| 2019/0366918 | A1 * | 12/2019 | Zhou | B60Q 1/50 |
| 2019/0366925 | A1 | 12/2019 | Yoshihara | |
| 2020/0369286 | A1 * | 11/2020 | Zhang | B60W 40/105 |

FOREIGN PATENT DOCUMENTS

| | | | |
|---|---|---|---|
| CN | 105741609 | A | 7/2016 |
| CN | 106162521 | A | 11/2016 |
| CN | 106530823 | A | 3/2017 |
| CN | 109421799 | A | 3/2019 |
| CN | 110549938 | A | 12/2019 |
| DE | 10 2016 119 486 | A1 | 4/2017 |
| JP | 2000113396 | A | 4/2000 |
| JP | 2001050760 | A | 2/2001 |
| JP | 2007302041 | A | 11/2007 |
| JP | 2011243084 | A | 12/2011 |
| JP | 2014002610 | A | 1/2014 |
| JP | 2015118404 | A | 6/2015 |
| JP | 2016081193 | A | 5/2016 |
| JP | 2016085657 | A | 5/2016 |
| JP | 2016115276 | A | 6/2016 |
| JP | 2016126400 | A | 7/2016 |
| JP | 2017058869 | A | 3/2017 |
| JP | 2017107328 | A | 6/2017 |
| JP | 2019211927 | A | 12/2019 |
| JP | 2020091652 | A | 6/2020 |
| WO | 2019138769 | A1 | 7/2019 |

* cited by examiner

WARNING DEVICE

CROSS-REFERENCE TO RELATED APPLICATIONS

The present application is a U.S. National Stage entry of PCT Application number PCT/JP2021/31155, filed on Aug. 25, 2021, which claims priority under 35 U.S.C. § 119(a) to Japanese Patent Application No. 2020-145357, filed on Aug. 31, 2020, contents of which are incorporated herein by reference in their entirety.

TECHNICAL FIELD

The present disclosure relates to a warning device that informs about the approach of a vehicle.

BACKGROUND OF THE INVENTION

Patent Document 1 discloses a system in which a VICS (Trademark) (Vehicle Information and Communication System) transmitter disposed above a right turn lane transmits information indicating that an oncoming vehicle is approaching a vehicle traveling in the right turn lane, and the vehicle that receives the information outputs a warning.

PRIOR ART

Patent Document

Patent Document 1: Japanese Unexamined Patent Application Publication No. 2000-113396

BRIEF DESCRIPTION OF THE INVENTION

Problem to be Solved by the Invention

However, the system described above cannot be applied to roads without VICS transmitters, and thus it has not been able to warn a vehicle intending to turn at an intersection that an oncoming vehicle is approaching.

Accordingly, the present disclosure focuses on these points, and its object is to provide a technique of warning the vehicle intending to turn at an intersection that an oncoming vehicle is approaching.

Means for Solving the Problem

In a first aspect of the present disclosure, there is provided a warning device including: a vehicle information acquiring part that acquires a state of a turn signal of a vehicle, vehicle speed of the vehicle, a position of the vehicle, an azimuth angle of the vehicle, and a yaw rate of the vehicle; an other vehicle information acquiring part that acquires a position and an azimuth angle of another vehicle via vehicle-to-vehicle communication; a right turn determining part that determines that the vehicle will turn right if the turn signal is in a right turn signal state and the vehicle speed is equal to or less than a creep speed; an oncoming vehicle approach determining part that determines that the other vehicle is approaching the vehicle as an oncoming vehicle when the right turn determining part determines that the vehicle will turn right, if i) a vehicle travel vector generated from the position of the vehicle to the right relative to a direction indicated by the azimuth angle of the vehicle and ii) an other vehicle travel vector starting from the position of the other vehicle along a direction indicated by the azimuth angle of the other vehicle intersect with each other, and if the position of the other vehicle is included in a predetermined angle range including the direction indicated by the azimuth angle of the vehicle; and an output control part that causes a warning to be output if the oncoming vehicle approach determining part determines that the other vehicle is approaching the vehicle, and if the yaw rate of the vehicle is equal to or greater than a predetermined angular velocity.

The vehicle information acquiring part may further acquire a state of a shift lever of the vehicle, and the right turn determining part may determine that the vehicle will turn right if: the turn signal is in the right turn signal state; the vehicle speed is equal to or less than the creep speed; and the shift lever has been kept in a drive position from before a moment when the turn signal enters the right turn signal state and the vehicle speed becomes equal to or less than the creep speed.

The right turn determining part may determine that the vehicle will turn right if: the turn signal is in the right turn signal state; the vehicle speed is equal to or less than the creep speed; and a predetermined time period has not passed since the vehicle speed became equal to or less than predetermined vehicle speed smaller than the creep speed.

The right turn determining part may determine that the vehicle will not turn right if: the turn signal was in the left turn signal state, or the turn signal was in an emergency flashing state, before a moment when the turn signal entered the right turn signal state and the vehicle speed became equal to or less than the creep speed, after the vehicle speed became equal to or less than the creep speed even if the turn signal is in the right turn signal state and the vehicle speed is equal to or less than the creep speed.

The vehicle information acquiring part may further acquire an accelerator opening degree of the vehicle, and the output control part may cause the warning to be output when the oncoming vehicle approach determining part determines that the other vehicle is approaching the vehicle, if the accelerator opening degree of the vehicle is greater than predetermined opening and if the yaw rate is equal to or greater than the predetermined angular velocity.

The vehicle information acquiring part may further acquire a state of a brake of the vehicle, and the output control part may cause the warning to be output when the oncoming vehicle approach determining part determines that the other vehicle is approaching the vehicle, if the accelerator opening degree of the vehicle is greater than the predetermined opening and if the yaw rate is equal to or greater than the predetermined angular velocity, after the state of the brake becomes off since the vehicle speed has become zero with the state of the brake being on.

The oncoming vehicle approach determining part may generate the vehicle travel vector along an average of directions indicated by a plurality of azimuth angles of the vehicle acquired immediately before, and may generate the other vehicle travel vector along an average of directions indicated by a plurality of azimuth angles of the other vehicle acquired immediately before.

The vehicle information acquiring part may acquire accuracy of the position of the vehicle and accuracy of the azimuth angle of the vehicle, the other vehicle information acquiring part may acquire accuracy of the position of the other vehicle and accuracy of the azimuth angle of the other vehicle, and the oncoming vehicle approach determining part may determine whether or not the other vehicle is approaching the vehicle if the accuracy of the position of the vehicle and the accuracy of the position of the other vehicle are equal to or greater than a position accuracy determination threshold, and if the accuracy of the azimuth angle of the vehicle and the accuracy of the azimuth angle of the other vehicle are equal to or greater than an azimuth angle accuracy determination threshold.

In a second aspect of the present disclosure, there is provided a warning device including: a vehicle information acquiring part that acquires a state of a turn signal of a vehicle, vehicle speed of the vehicle, a position of the vehicle, an azimuth angle of the vehicle, and a yaw rate of the vehicle; an other vehicle information acquiring part that acquires a position and an azimuth angle of another vehicle via vehicle-to-vehicle communication; a left turn determining part that determines that the vehicle will turn left if the turn signal is in a left turn signal state and the vehicle speed is equal to or less than a creep speed; an oncoming vehicle approach determining part that determines that the other vehicle is approaching the vehicle as an oncoming vehicle when the left turn determining part determines that the vehicle will turn left, if i) a vehicle travel vector generated from the position of the vehicle to the left relative to a direction indicated by the azimuth angle of the vehicle and ii) an other vehicle travel vector starting from the position of the other vehicle along a direction indicated by the azimuth angle of the other vehicle intersect with each other, and if the position of the other vehicle is included in a predetermined angle range including the direction indicated by the azimuth angle of the vehicle; and an output control part that causes a warning to be output if the oncoming vehicle approach determining part determines that the other vehicle is approaching the vehicle, and if the yaw rate of the vehicle is equal to or greater than a predetermined angular velocity.

Effect of the Invention

According to the present disclosure, it is possible to warn a vehicle intending to turn at an intersection that an oncoming vehicle is approaching.

DESCRIPTION OF EMBODIMENTS

[Configuration of the Vehicle A]

Figure 1:
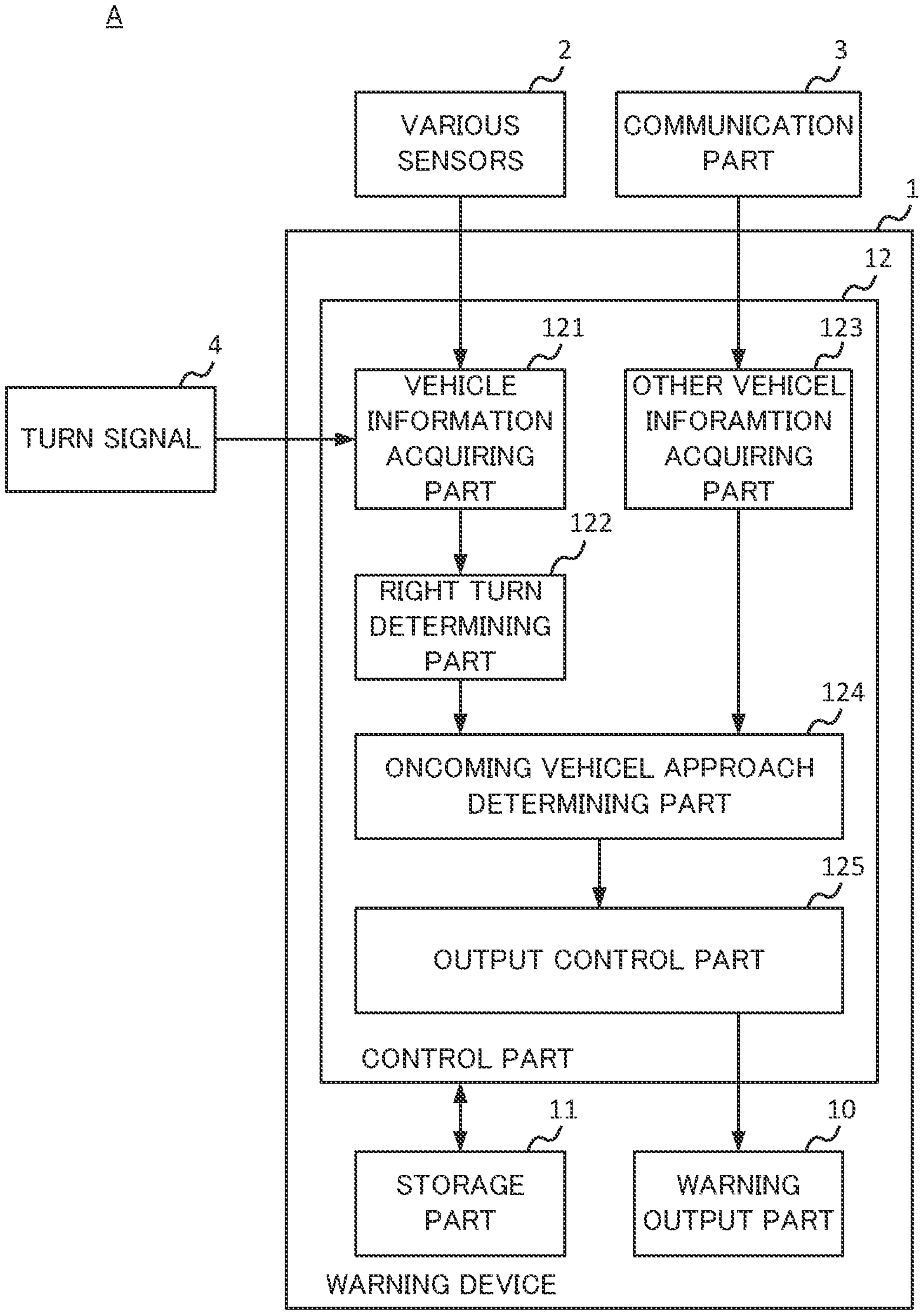
FIG. 1 schematically shows a configuration of a vehicle according to an embodiment.

FIG. 1 schematically shows a configuration of a vehicle A according to an embodiment. The vehicle A includes a warning device 1, various sensors 2, a communication part 3, and a turn signal 4.

The various sensors 2 include a plurality of sensors that detect information concerning the vehicle A. For example, the various sensors 2 include a vehicle speed sensor that detects vehicle speed of the vehicle A, and a yaw angular velocity sensor that detects a yaw rate of the vehicle A.

The various sensors 2 detect a position of the vehicle A. The various sensors 2 include a Global Positioning System (GPS) receiver, for example, and specify coordinates indicating the position of the vehicle A. The various sensors 2 may include not only a GPS receiver but also a receiver that receives information transmitted from another positioning system. The other positioning system is a quasi-zenith satellite system (known as Michibiki), for example. Further, the various sensors 2 can specify detection accuracy of the position of the vehicle A. The various sensors 2 include a geomagnetic sensor that detects an azimuth angle of the vehicle A, detect an azimuth angle of the vehicle A with respect to north, and specify detection accuracy of the azimuth angle. The various sensors 2 output detected information concerning the subject vehicle to the warning device 1.

The communication part 3 is a wireless communication module that transmits and receives information to and from other vehicles around the vehicle A via vehicle-to-vehicle communication. The wireless communication standard is Dedicated Short Range Communications (DSRC), for example, but is not limited thereto. The communication part 3 receives, from another vehicle around the vehicle A, information concerning the other vehicle and outputs received information concerning the other vehicle to the warning device 1.

The turn signal 4 is a front turn signal (lamp) disposed on each of the left and right sides on a front face of the vehicle A in order to indicate a left/right turn and a direction of course change to neighboring vehicles. The turn signal 4 enters a right turn signal state where a right front turn signal flashes, a left turn signal state where a left front turn signal flashes, an emergency flashing state where the both left and right front turn signals flash, and a standby state where the both left and right front turn signals do not flash, in accordance with an operation performed by the driver of the vehicle A.

The warning device 1 determines whether or not the vehicle A is to make a turn on the basis of the information concerning the vehicle A acquired by the various sensors 2. Next, if it is determined that the vehicle A is to make a turn, the warning device 1 determines whether or not any one of a plurality of other vehicles is approaching the vehicle A as an oncoming vehicle, on the basis of information concerning the plurality of other vehicles acquired via the communication part 3. Then, the warning device 1 outputs a warning when the vehicle A starts making a turn in a situation where another vehicle is approaching the vehicle A as an oncoming vehicle. Hereinafter, a case of so-called left-hand traffic, where vehicles travel on the left side on a road separated by the center will be described.

[Configuration of the Warning Device 1]

The warning device 1 includes a warning output part 10, a storage part 11, and a control part 12. The warning output part 10 includes a speaker or a buzzer, for example, and outputs an audio warning under the control of the control part 12.

The storage part 11 includes storage media such as a Read Only Memory (ROM), a Random Access Memory (RAM), and a hard disk. The storage part 11 stores a program executed by the control part 12.

The control part 12 is a calculation resource including a processor such as a Central Processing Unit (CPU). By executing a program stored in the storage part 11, the control part 12 functions as a vehicle information acquiring part 121, a right turn determining part 122, an other vehicle information acquiring part 123, an oncoming vehicle approach determining part 124, and an output control part 125.

The vehicle information acquiring part 121 sequentially acquires the information concerning the vehicle A detected by the various sensors 2. For example, the vehicle information acquiring part 121 acquires the vehicle speed of the vehicle A and the yaw rate of the vehicle A. Further, the vehicle information acquiring part 121 acquires the coordinates indicating the position of the vehicle A and the azimuth angle of the vehicle A. Further, the vehicle information acquiring part 121 acquires a state of the turn signal 4 of the vehicle A from the turn signal 4. The vehicle information acquiring part 121 specifies whether the turn signal 4 is in the right turn signal state, the left turn signal state, or the emergency flashing state (which is a so-called "hazard" state). Further, the vehicle information acquiring part 121 may specify whether the turn signal 4 is in the standby state.

Figure 2:
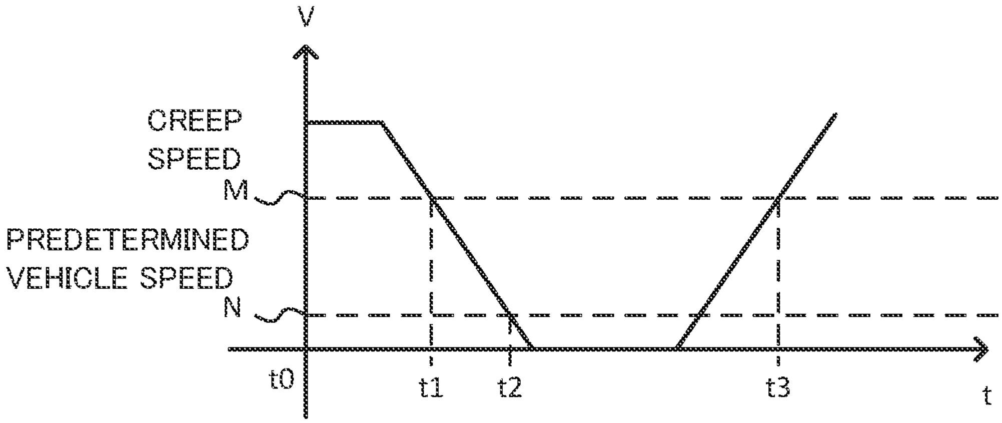
FIG. 2 schematically shows a change over time in vehicle speed when the vehicle turns right.

The right turn determining part 122 determines whether or not the vehicle A will turn right on the basis of the information concerning the vehicle A acquired by the vehicle information acquiring part 121. The right turn determining part 122 determines that the vehicle A will turn right if the turn signal 4 is in the right turn signal state, and the vehicle speed of the vehicle A is equal to or less than a creep speed. FIG. 2 schematically shows a change over time in the vehicle speed when the vehicle A turns right. In FIG. 2, the horizontal axis represents a timing t, and the vertical axis represents vehicle speed V. The right turn determining part 122 determines that the vehicle A will turn right if the turn signal 4 is in the right turn signal state at or after a timing t1 when the vehicle speed V became creep speed M. The creep speed M is a vehicle speed at which a vehicle can stop within one meter, for example. A specific value of the vehicle speed at which the vehicle can stop within one meter is 10 kilometers per hour, for example.

The right turn determining part 122 may determine that the vehicle A will turn right if the turn signal 4 is in the right turn signal state, the vehicle speed V is equal to or less than the creep speed M, and a predetermined condition is satisfied. For example, the right turn determining part 122 may determine whether or not the vehicle A will turn right on the basis of a state of a shift lever of the vehicle A. In this case, the vehicle information acquiring part 121 acquires the state of the shift lever of the vehicle A. Then, the right turn determining part 122 determines that the vehicle A will turn right if the turn signal 4 is in the right turn signal state, the vehicle speed V is equal to or less than the creep speed M, and the shift lever has been kept in a drive position from before a moment when the turn signal 4 entered the right turn signal state and the vehicle speed became equal to or less than the creep speed M. The right turn determining part 122 determines that the vehicle A will not turn right if the position of the shift lever is shifted to a position different than the drive position (e.g., a neutral position or a park position) even once, after the turn signal 4 has become the right turn signal state and the vehicle speed has become equal to or less than the creep speed M. In this manner, if the shift lever was shifted to the neutral position or park position different than the drive position, it is assumed that the vehicle stops, and thus the right turn determining part 122 can determine that the vehicle A will not turn right.

The right turn determining part 122 determines that the vehicle A will turn right if a predetermined time period has not passed since the vehicle speed V became equal to or less than a predetermined vehicle speed N, which is smaller than the creep speed M, after it was determined that the vehicle A was to turn right due to the above condition being satisfied. The predetermined vehicle speed N is three kilometers per hour, for example. Specifically, the right turn determining part 122 continues determining that the vehicle A will turn right, until a predetermined time period passes from a timing t2 when the vehicle speed V became equal to or less than the predetermined vehicle speed N after determining that the vehicle A will turn right. Then, after the predetermined time period has passed, the right turn determining part 122 determines that the vehicle A will not turn right. The predetermined time period may be determined on the basis of the time it takes for a display of a traffic light to complete its cycle, and a specific value of the predetermined time period is 150 seconds, for example. Due to this, the right turn determining part 122 can prevent accidentally determining that the vehicle A will turn right if the vehicle A is less likely to turn right because the vehicle A stops longer than when the vehicle A waits at a traffic light.

Even if the turn signal 4 is in the right turn signal state and the vehicle speed V is equal to or less than the creep speed M, the right turn determining part 122 determines that the vehicle A will not turn right in a situation where the vehicle A is unlikely to turn right. For example, the right turn determining part 122 determines that the vehicle A will not turn right if the turn signal 4 was in the left turn signal state or in the emergency flashing state before the moment when the turn signal 4 became the right turn signal state and the vehicle speed V became equal to or less than the creep speed M. The right turn determining part 122 determines that the vehicle A will not turn right if the turn signal 4 enters the left turn signal state or the emergency flashing state even once, at a timing at or after the timing t1 when the vehicle speed V became equal to or less than the creep speed M, as shown in FIG. 2.

In this manner, the right turn determining part 122 can determine that the vehicle A does not turn right if the vehicle A changes its course (e.g., if the vehicle A moves to the left and then returns to avoid an obstruction or the like on the right side of the vehicle A). Further, the right turn determining part 122 determines that the vehicle A will not turn right if the vehicle A, which has stopped at a shoulder, starts traveling. Specifically, the right turn determining part 122 determines that the vehicle A will not turn right if the vehicle A starts traveling after stopping with its hazards turned on, causing the turn signal 4 to be in the emergency flashing state. As a result, the right turn determining part 122 can prevent determining that the vehicle A will turn right in a situation where the vehicle A will not turn right, such as when the vehicle A changes its course or when the stopped vehicle A starts traveling.

The other vehicle information acquiring part 123 acquires information concerning another vehicle from the other vehicle traveling around the vehicle A via the communication part 3 through the vehicle-to-vehicle communication. Specifically, the other vehicle information acquiring part 123 acquires the vehicle speed of the other vehicle and coordinates and an azimuth angle indicating a position of the other vehicle detected by the other vehicle.

The oncoming vehicle approach determining part 124 determines whether or not any one of a plurality of other vehicles traveling around the vehicle A is approaching the vehicle A as an oncoming vehicle. For example, if the vehicle A turns right, the oncoming vehicle approach determining part 124 determines whether or not the other vehicle traveling around the vehicle A is approaching the vehicle A as an oncoming vehicle on the basis of the information concerning the other vehicle. Specifically, the oncoming vehicle approach determining part 124 determines that the other vehicle is approaching the vehicle A as an oncoming vehicle if a vehicle travel vector indicating a direction in which the vehicle A turning right travels and an other vehicle travel vector indicating a direction in which the other vehicle travels intersect with each other, and the other vehicle is present in front of the vehicle A in its travel direction.

Figure 3:
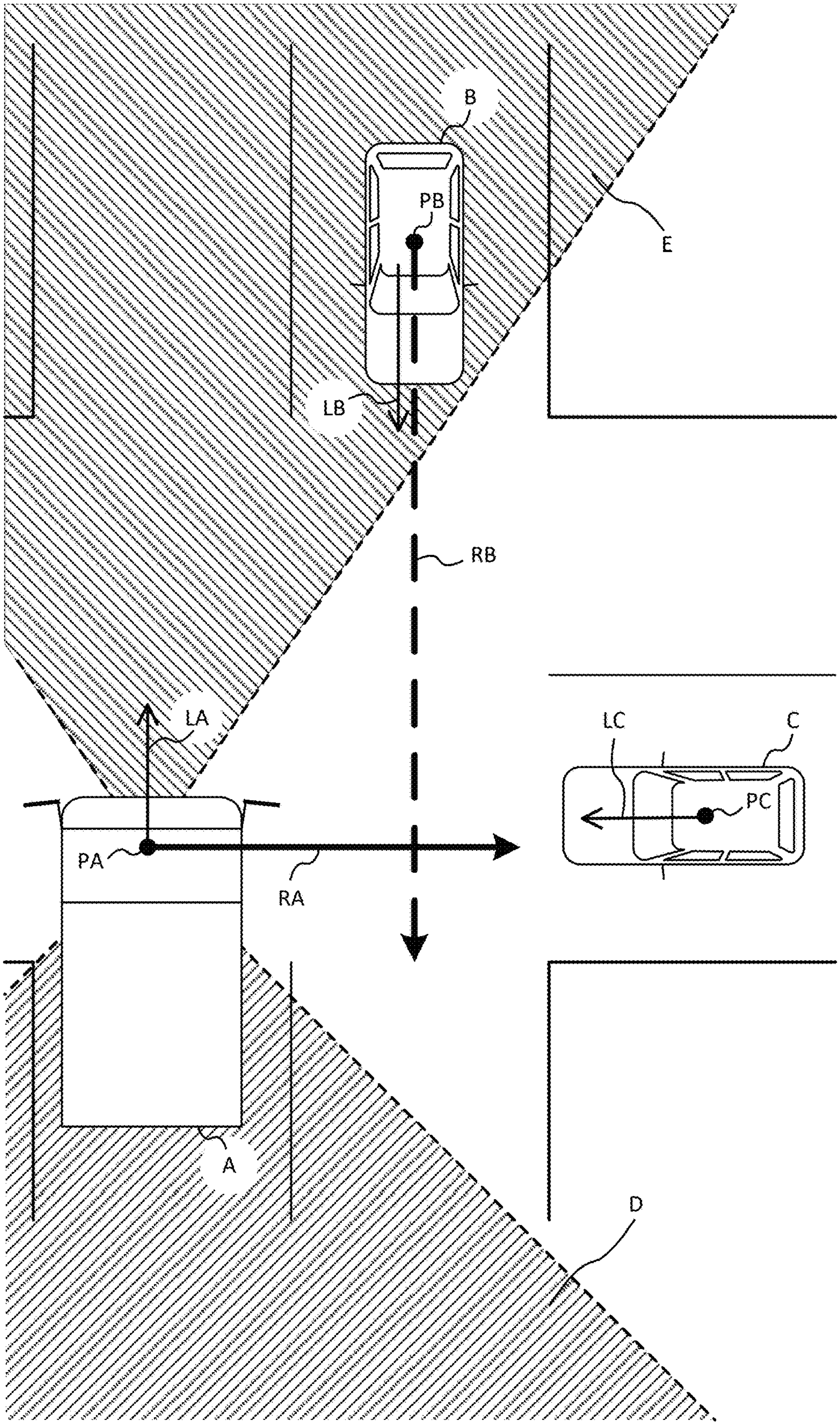
FIG. 3 is a diagram for explaining processing of determining whether another vehicle is approaching the vehicle as an oncoming vehicle.

FIG. 3 is a diagram for explaining processing of determining whether the other vehicle is approaching the vehicle A as an oncoming vehicle. Here, an other vehicle B will be described as an example of the other vehicle, but similar processing is performed on an other vehicle C shown in FIG. 3.

First, the oncoming vehicle approach determining part 124 generates a vehicle travel vector RA from a position PA of the vehicle A to the right relative to a direction indicated by the azimuth angle of the vehicle A (hereinafter referred to as a vehicle direction LA). The position PA where the vehicle travel vector RA starts is a position of a GPS receiver installed in the vehicle A. Specifically, the oncoming vehicle approach determining part 124 generates the vehicle travel vector RA having a predetermined length from the position PA of the vehicle A at 90 degrees to the right relative to the vehicle direction LA. A specific value of the predetermined length may be appropriately set, and may be 10 meters, for example.

The oncoming vehicle approach determining part 124 determines an average of directions indicated by a plurality of azimuth angles of the vehicle A detected in the past, as the vehicle direction LA. For example, the oncoming vehicle approach determining part 124 determines a direction indicated by an average value of the plurality of azimuth angles of the vehicle A detected within 30 meters from the position PA of the vehicle A, as the vehicle direction LA. It should be noted the azimuth angle of the vehicle A is detected every two meters. Due to this, the oncoming vehicle approach determining part 124 can specify the direction of the vehicle A in the case of curvy roads more appropriately, for example.

Next, the oncoming vehicle approach determining part 124 generates an other vehicle travel vector RB along a direction indicated by an azimuth angle of the other vehicle B (hereinafter referred to as an other vehicle direction LB) from a position PB of the other vehicle B. For example, the oncoming vehicle approach determining part 124 generates the other vehicle travel vector RB having a predetermined length from the position PB of the other vehicle B. Specifically, the oncoming vehicle approach determining part 124 generates the other vehicle travel vector RB having a predetermined length obtained by multiplying the vehicle speed of the other vehicle B by a predetermined time period. The position PB where the other vehicle travel vector RB starts is a position of a GPS receiver installed in the other vehicle B. A specific value of the predetermined time period may be appropriately set, and is five seconds, for example. Then, the oncoming vehicle approach determining part 124 determines whether or not the generated vehicle travel vector RA and the other vehicle travel vector RB intersect with each other.

It should be noted that if the other vehicle direction LB is opposite to the vehicle direction LA, the oncoming vehicle approach determining part 124 may determine whether or not the vehicle travel vector RA and the other vehicle travel vector RB intersect with each other. Specifically, if the other vehicle direction LB is within a direction determination range D defined with respect to the azimuth angle indicating the vehicle direction LA, the oncoming vehicle approach determining part 124 determines that the other vehicle direction LB is opposite to the vehicle direction LA. The direction determination range D is a range from plus 135 degrees to plus 225 degrees with respect to the azimuth angle indicating the vehicle direction LA.

The oncoming vehicle approach determining part 124 may determine that the other vehicle direction LB is opposite to the vehicle direction LA if the other vehicle direction LB indicated by an average value of a plurality of azimuth angles of the other vehicle B acquired immediately before is within the direction determination range D (see FIG. 3). In this case, the oncoming vehicle approach determining part 124 sets a direction indicated by an average value of 10 azimuth angles of the other vehicle B acquired immediately before as the other vehicle direction LB. In this manner, the oncoming vehicle approach determining part 124 can detect the direction of the other vehicle more appropriately in the case of curvy roads, for example.

In FIG. 3, the direction determination range D is a range filled with positively sloped lines. Since the other vehicle direction LB of the other vehicle B is included in the direction determination range D, the oncoming vehicle approach determining part 124 determines that the other vehicle direction LB of the other vehicle B is opposite to the vehicle direction LA. On the other hand, since an other vehicle direction LC of the other vehicle C is not included in the direction determination range D, the oncoming vehicle approach determining part 124 determines that the other vehicle direction LC of the other vehicle C is not opposite to the vehicle direction LA.

The oncoming vehicle approach determining part 124 determines whether or not the other vehicle is present in front of the vehicle A in its travel direction. For example, if the position of the other vehicle is included in a predetermined angle range E including the vehicle direction LA, the oncoming vehicle approach determining part 124 determines that the other vehicle B is present in front of the vehicle A in its travel direction. The predetermined angle range E is, for example, a range from minus 75 degrees to plus 75 degrees with respect to the azimuth angle indicating the vehicle direction LA. In FIG. 3, the predetermined angle range E is a range filled with negatively sloped lines. Since the position PB of the other vehicle B is included in the predetermined angle range E, the oncoming vehicle approach determining part 124 determines that the other vehicle B is present in front of the vehicle A in its travel direction. On the other hand, since a position PC of the other vehicle C is not included in the predetermined angle range E, the oncoming vehicle approach determining part 124 determines that the other vehicle C is not present in front of the vehicle A in its travel direction.

It should be noted that, if it is determined that the other vehicle B is present in front of the vehicle A in its travel direction, the oncoming vehicle approach determining part 124 continues to determine that the other vehicle B is present in front of the vehicle A in its travel direction until the position PB of the other vehicle B is no longer included in an exclusion determination range wider than the predetermined angle range E. The exclusion determination range is a range from minus 135 degrees to plus 135 degrees with respect to the azimuth angle indicating the vehicle direction LA, for example.

If the accuracy of positions and the accuracy of azimuth angles are high, the oncoming vehicle approach determining part 124 may determine whether or not the other vehicle B is approaching the vehicle A as an oncoming vehicle. In this case, the vehicle information acquiring part 121 acquires, from the various sensors 2, detection accuracy of the position PA and detection accuracy of the azimuth angle of the vehicle A. For example, the vehicle information acquiring part 121 acquires any value from 0 to 15 as the detection accuracy of the position PA of the vehicle A. The larger the value is, the higher the detection accuracy is assumed to be. It should be noted that the detection accuracy of the azimuth angle is assumed to be the same as the detection accuracy of the position. Further, the other vehicle information acquiring part 123 acquires detection accuracy of the position PB and detection accuracy of the azimuth angle of the other vehicle B from the other vehicle B via the vehicle-to-vehicle communication. The detection accuracy of the position PB and the detection accuracy of the azimuth angle of the other vehicle B are the same as the detection accuracy of the position PA and the detection accuracy of the azimuth angle of the vehicle A, respectively.

The oncoming vehicle approach determining part 124 determines whether or not the other vehicle B is approaching the vehicle A as an oncoming vehicle if the detection accuracy of the position PA of the vehicle A and the detection accuracy of the position PB of the other vehicle B are equal to or greater than a position accuracy determination threshold, and the detection accuracy of the azimuth angle of the vehicle A and the detection accuracy of the azimuth angle of the other vehicle B are equal to or greater than an azimuth angle accuracy determination threshold. If any one of the above conditions is not satisfied, the oncoming vehicle approach determining part 124 does not determine whether or not the other vehicle B is approaching the vehicle A as an oncoming vehicle. A specific value of the position accuracy determination threshold is 10, for example. A specific value of the azimuth angle accuracy determination threshold is 4, for example. As described above, since the oncoming vehicle approach determining part 124 does not determine whether or not the other vehicle B is approaching if one of the accuracy of the position or the accuracy of the azimuth angle is relatively low, false determination due to relatively low accuracy of the position or azimuth angle can be prevented.

The oncoming vehicle approach determining part 124 determines that the other vehicle B is approaching the vehicle A as an oncoming vehicle if the vehicle travel vector RA and the other vehicle travel vector RB intersect with each other, the vehicle direction LA and the other vehicle direction LB are opposite to each other, and the other vehicle B is present in front of the vehicle A in its travel direction. In this manner, since the oncoming vehicle approach determining part 124 can exclude the other vehicle C that does not approach the vehicle A as an oncoming vehicle, it is possible to increase the probability of specifying the other vehicle B approaching the vehicle A as an oncoming vehicle, from the plurality of other vehicles traveling around the vehicle A.

In a case where the other vehicle B is approaching the vehicle A as an oncoming vehicle, if the vehicle A starts to turn right, the output control part 125 causes the warning output part 10 to output a warning indicating that the other vehicle B is approaching the vehicle A as an oncoming vehicle. For example, if the yaw rate of the vehicle A detected by the vehicle information acquiring part 121 is equal to or greater than a predetermined angular velocity, it is determined that the vehicle A has started to turn right, and the output control part 125 causes the warning output part 10 to output a warning. The predetermined angular velocity may be appropriately set by an experiment or the like, and is 1.5 degrees per second, for example.

Further, the output control part 125 may cause a warning to be output in a case where the other vehicle B is approaching the vehicle A as an oncoming vehicle, if an accelerator opening degree of the vehicle A is greater than a predetermined opening and the yaw rate is equal to or greater than a predetermined angular velocity. In this case, the vehicle information acquiring part 121 acquires the accelerator opening degree of the vehicle A. The predetermined opening may be set as a value that allows determining that a driver has depressed an accelerator pedal. A specific value of the predetermined opening is 5%, for example, if a state where the accelerator pedal is depressed to the maximum is taken as 100%. By doing so, the output control part 125 can cause the warning output part 10 to output a warning if the driver of the vehicle A depresses the accelerator pedal to start to turn right even though the other vehicle B is approaching the vehicle A as an oncoming vehicle.

Normally, in a case where the vehicle A enters an intersection, the vehicle A comes to a stop before the intersection and then enters the intersection. Thus, if the vehicle A has stopped temporarily while it is determined that the vehicle A will turn right, the vehicle A is highly likely to turn right at the intersection shortly. Accordingly, when the temporarily stopped vehicle A starts to turn right in a case where the other vehicle B is approaching the vehicle A as an oncoming vehicle, the output control part 125 causes a warning to be output. In this case, the vehicle information acquiring part 121 further acquires a state of a brake of the vehicle A.

If the other vehicle B is approaching the vehicle A as an oncoming vehicle in a state where it is determined that the vehicle A will turn right, the output control part 125 determines whether or not the state of the brake is on and the vehicle speed has become equal to or less than a predetermined speed. The predetermined speed is a value that allows determining that the vehicle A has stopped temporarily. A specific value that allows determining that the vehicle A stopped temporarily is three kilometers per hour, for example, but may be zero kilometers per hour. Next, the output control part 125 determines whether or not the state of the brake is off after the vehicle speed has become equal to or less than a value that allows determining that the vehicle A stopped temporarily while the state of the brake is on. Then, the output control part 125 causes a warning to be output if the accelerator opening degree of the vehicle is greater than the predetermined opening and the yaw rate is equal to or greater than the predetermined angular velocity after the state of the brake was off.

In this manner, the output control part 125 can output a warning indicating that the other vehicle B is approaching the vehicle A as an oncoming vehicle, in a situation that necessitates a warning, where the vehicle A starts to turn right when the other vehicle B is approaching the vehicle A as an oncoming vehicle. As a result, the output control part 125 can enhance the safety of the vehicle A. Further, the output control part 125 does not output a warning if the vehicle A is unlikely to enter an intersection and to turn right or if the other vehicle B is not approaching as an oncoming vehicle. This makes it possible to reduce false warnings.

[Processing for Determining Whether or not the Vehicle A Will Turn Right]

Figure 4:
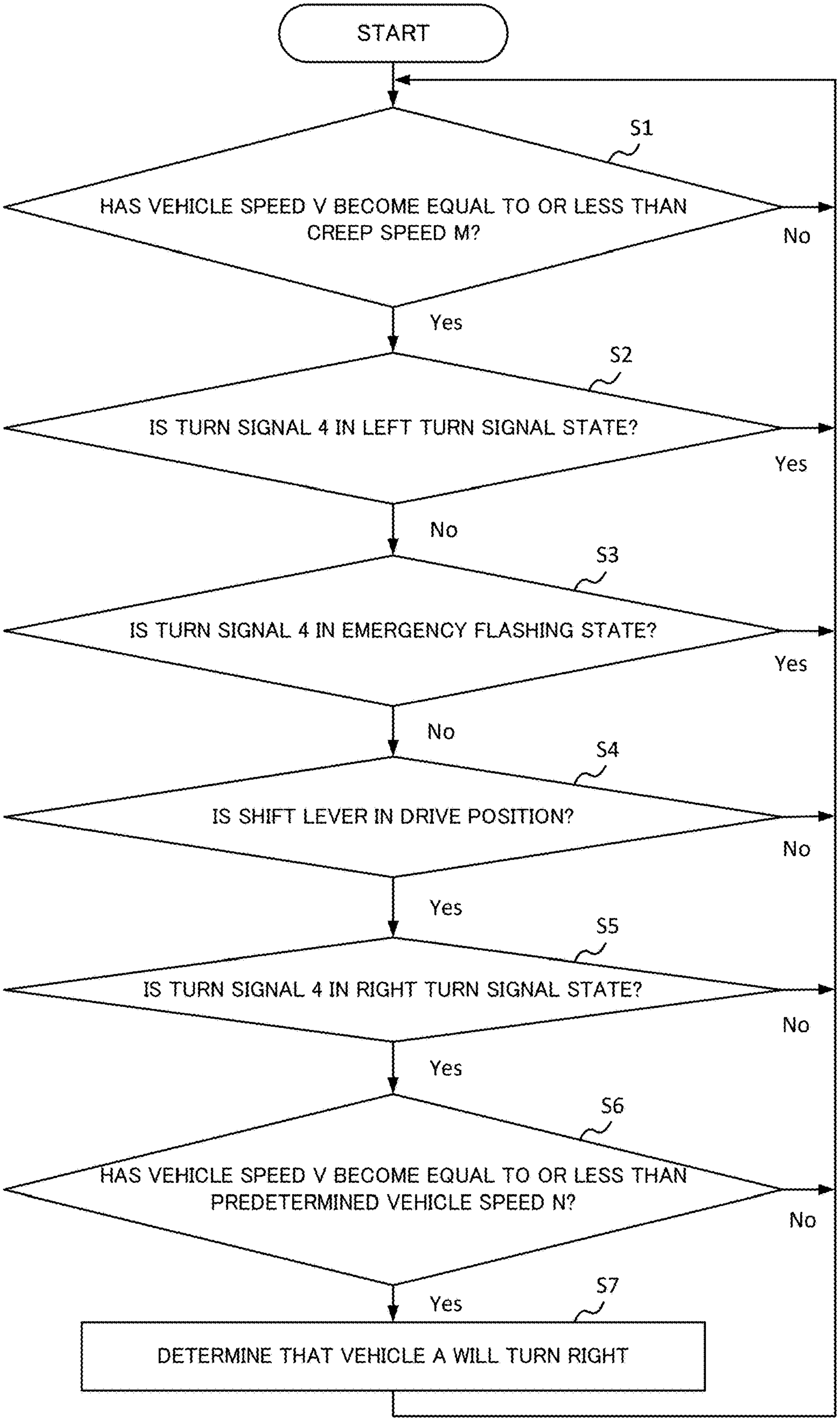
FIG. 4 is a flowchart showing an example of processing of determining whether or not the vehicle turns right.

FIG. 4 is a flowchart showing an example of processing of determining whether or not the vehicle A will turn right. The right turn determining part 122 sequentially executes the processing shown in FIG. 4 while the vehicle A is activated. Further, it is assumed that the vehicle information acquiring part 121 sequentially acquires various types of information concerning the vehicle A.

First, the right turn determining part 122 determines whether or not the vehicle speed V of the vehicle A acquired by the vehicle information acquiring part 121 has become equal to or less than the creep speed M (S1). Specifically, the right turn determining part 122 determines that the vehicle speed V has become equal to or less than the creep speed M if the vehicle speed V acquired immediately before is greater than the creep speed M, and a newly acquired vehicle speed V is equal to or less than the creep speed M. If the vehicle speed V is not equal to or less than the creep speed M ("No" in S1), the right turn determining part 122 determines that the vehicle A will not turn right, and returns to S1.

If the vehicle speed V has become equal to or less than the creep speed M ("Yes" in S1), the right turn determining part 122 determines whether or not the turn signal 4 is in the left turn signal state (S2). For example, if the switch of the turn signal 4 of the vehicle A is flicked to the left turn signal position, the right turn determining part 122 determines that the turn signal 4 is in the left turn signal state. If the turn signal 4 is in the left turn signal state ("Yes" in S2), the right turn determining part 122 determines that the vehicle A will not turn right, and returns to S1.

If the turn signal 4 is not in the left turn signal state ("No" in S2), the right turn determining part 122 determines whether or not the turn signal 4 is in the emergency flashing state (S3). For example, if a switch for setting the turn signal 4 of the vehicle A to the emergency flashing state (a hazard switch) is on, the right turn determining part 122 determines that the turn signal 4 is in the emergency flashing state. If the turn signal 4 is in the emergency flashing state ("Yes" in S3), the right turn determining part 122 determines that the vehicle A will not turn right, and returns to S1.

If the turn signal 4 is not in the emergency flashing state ("No" in S3), the right turn determining part 122 determines whether or not the shift lever of the vehicle A is in the drive position (S4). For example, if the shift lever has been kept in the drive position after the vehicle speed V has become equal to or less than the creep speed M, the right turn determining part 122 determines that the shift lever is in the drive position. The right turn determining part 122 determines that the vehicle A will not turn right, and returns to step S1 if the shift lever is shifted to a position different than the drive position (e.g., the neutral position or park position) after the vehicle speed V has become equal to or less than the creep speed M ("No" in S4).

If the shift lever is in the drive position ("Yes" in S4), the right turn determining part 122 determines whether or not the turn signal 4 is in the right turn signal state (S5). If the switch of the turn signal 4 of the vehicle A is flicked to the right turn signal position, the right turn determining part 122 determines that the turn signal 4 is in the right turn signal state. If the turn signal 4 is not in the right turn signal state ("No" in S5), the right turn determining part 122 determines that the vehicle A will not turn right, and returns to S1.

If the turn signal 4 is in the right turn signal state ("Yes" in S5), the right turn determining part 122 determines whether or not the vehicle speed V of the vehicle A has become equal to or less than the predetermined vehicle speed N (S6). For example, if a state where the vehicle speed V is equal to or less than the predetermined vehicle speed N continues for a predetermined time period, the right turn determining part 122 determines that the vehicle speed V has become equal to or less than the predetermined vehicle speed N. The predetermined time period is one second, for example. Further, the right turn determining part 122 may determine whether or not the vehicle speed has become zero to cause the vehicle A to stop. If the vehicle speed V of the vehicle A is greater than the predetermined vehicle speed N ("No" in S6), the right turn determining part 122 determines that the vehicle A will not turn right, and returns to S1. If the vehicle speed V of the vehicle A has become equal to or less than the predetermined vehicle speed N ("Yes" in S6), the right turn determining part 122 determines that the vehicle A will turn right (S7).

[Processing of Determining Whether or not the Other Vehicle B Approaches the Vehicle A as an Oncoming Vehicle]

Figure 5:
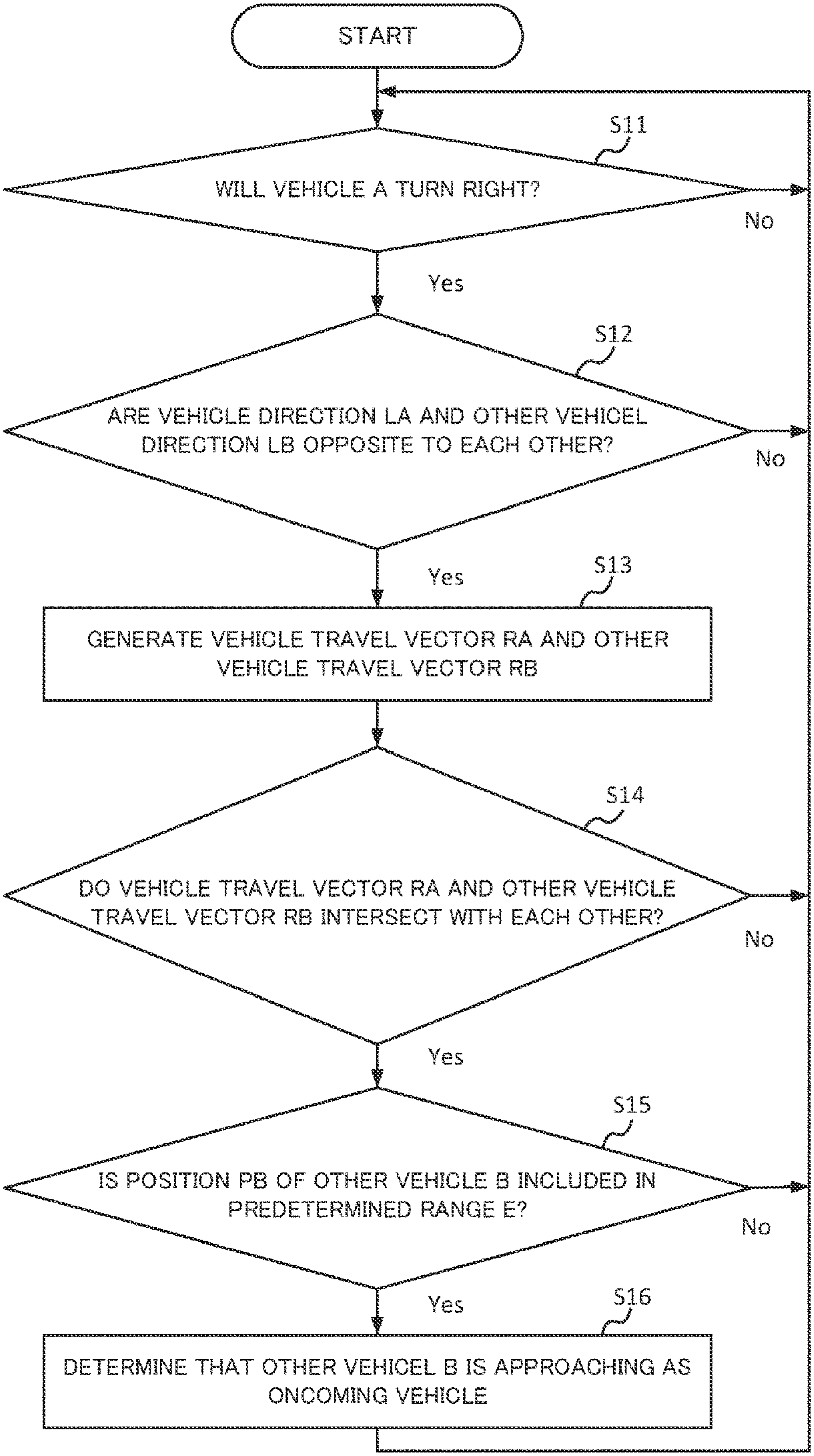
FIG. 5 is a flowchart showing an example of processing of determining whether or not another vehicle is approaching the vehicle as an oncoming vehicle.

FIG. 5 is a flowchart showing an example of processing of determining whether or not the other vehicle B is approaching the vehicle A as an oncoming vehicle. The oncoming vehicle approach determining part 124 sequentially executes the processing shown in FIG. 5 at the same timing as a timing when the right turn determining part 122 executes the processing of determining whether or not the vehicle A will turn right. Further, it is assumed that the other vehicle information acquiring part 123 sequentially acquires various types of information concerning the other vehicle B.

First, the oncoming vehicle approach determining part 124 determines whether or not the vehicle A will turn right (S11). For example, the oncoming vehicle approach determining part 124 determines whether or not the right turn determining part 122 determined that the vehicle A was to turn right. If the vehicle A will not turn right ("No" in S11), the oncoming vehicle approach determining part 124 returns to S11.

If the vehicle A will turn right ("Yes" in S11), the oncoming vehicle approach determining part 124 determines whether or not the vehicle direction LA indicated by the azimuth angle of the vehicle A, and the other vehicle direction LB indicated by the azimuth angle of the other vehicle B are opposite to each other (S12). For example, if the other vehicle direction LB is within the predetermined direction determination range D with respect to the azimuth angle indicating the vehicle direction LA (see FIG. 3), the oncoming vehicle approach determining part 124 determines that the other vehicle direction LB is opposite to the vehicle direction LA. If the vehicle direction LA and the other vehicle direction LB are not opposite to each other ("No" in S12), the oncoming vehicle approach determining part 124 determines that the other vehicle B is not approaching the vehicle A as an oncoming vehicle, and returns to S11.

If the vehicle direction LA and the other vehicle direction LB are opposite to each other ("Yes" in S12), the oncoming vehicle approach determining part 124 generates the vehicle travel vector RA and the other vehicle travel vector RB (S13). Specifically, the oncoming vehicle approach determining part 124 generates the vehicle travel vector RA having the predetermined length from the position PA of the vehicle A to the right relative to the vehicle direction LA. Further, the oncoming vehicle approach determining part 124 generates the other vehicle travel vector RB, along the other vehicle direction LB, having a length obtained by multiplying the vehicle speed of the other vehicle B by the predetermined time period.

The oncoming vehicle approach determining part 124 determines whether or not the generated vehicle travel vector RA and the other vehicle travel vector RB intersect with each other (S14). If the vehicle travel vector RA and the other vehicle travel vector RB do not intersect with each other ("No" in S14), the oncoming vehicle approach determining part 124 determines that the other vehicle B is not approaching the vehicle A as an oncoming vehicle, and returns to S11.

If the vehicle travel vector RA and the other vehicle travel vector RB intersect with each other ("Yes" in S14), the oncoming vehicle approach determining part 124 determines whether or not the position PB of the other vehicle B is included in the predetermined angle range E (S15). For example, the oncoming vehicle approach determining part 124 determines whether or not the position PB of the other vehicle B is included in the predetermined angle range E (see FIG. 3) defined with the position PA of the vehicle A as a starting point. If the position PB of the other vehicle B is not included in the predetermined angle range E ("No" in S15), the oncoming vehicle approach determining part 124 determines that the other vehicle B is not approaching the vehicle A as an oncoming vehicle, and returns to S11. If the position PB of the other vehicle B is included in the predetermined angle range E ("Yes" in S15), the oncoming vehicle approach determining part 124 determines that the other vehicle B is approaching the vehicle A as an oncoming vehicle. It should be noted that the oncoming vehicle approach determining part 124 executes the above-described processing for each of the plurality of other vehicles traveling around the vehicle A.

[Processing of Outputting a Warning]

Figure 6:
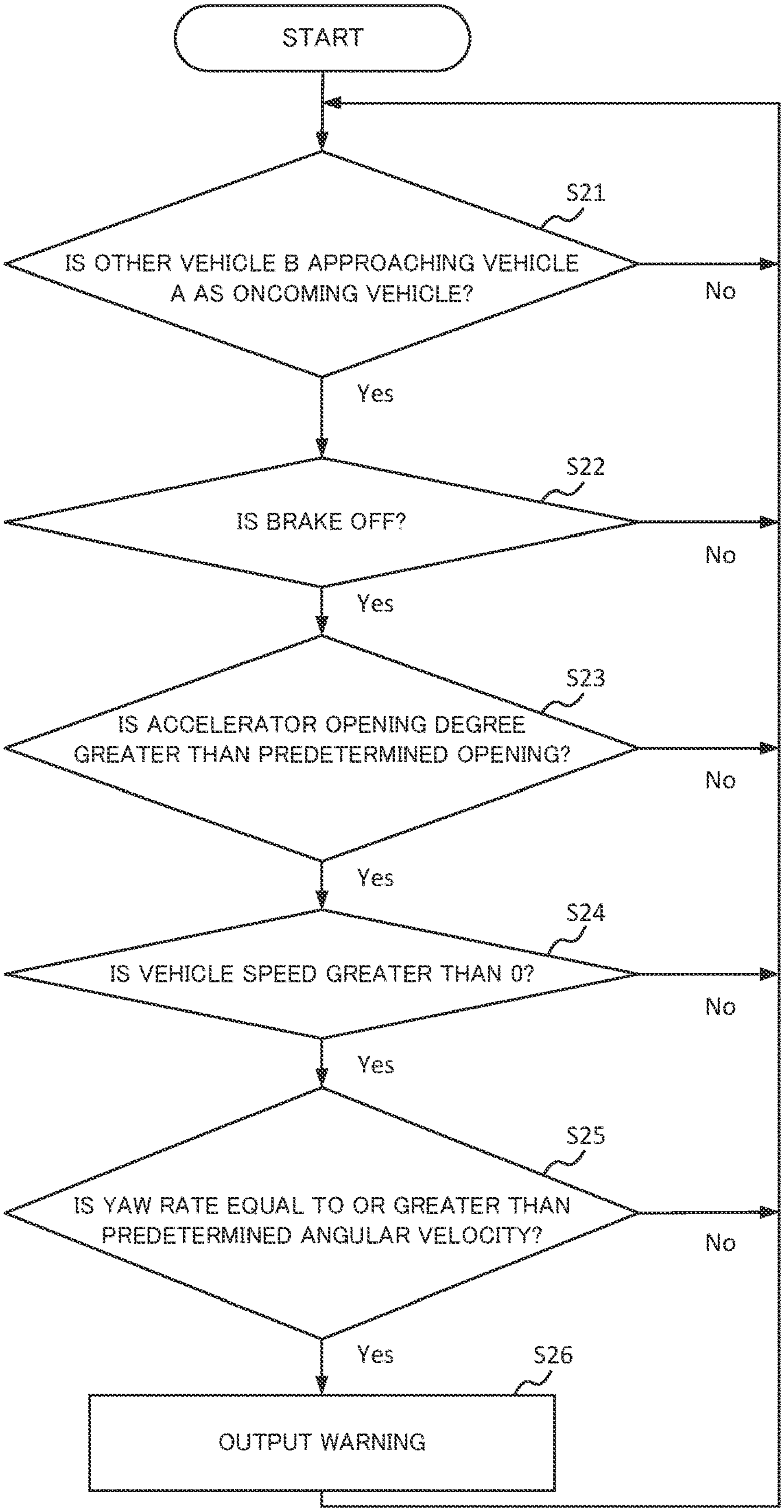
FIG. 6 is a flowchart showing an example of processing of outputting a warning.

FIG. 6 is a flowchart showing an example of processing of outputting a warning. The output control part 125 sequentially executes the processing shown in FIG. 6 at the same timing as the timing when the right turn determining part 122 executes the processing of determining whether or not the vehicle A will turn right.

First, the output control part 125 determines whether or not the other vehicle B is approaching the vehicle A as an oncoming vehicle (S21). For example, the output control part 125 determines whether or not the other vehicle approach determining part 124 determined that the other vehicle B was approaching the vehicle A as an oncoming vehicle. If the other vehicle B is not approaching the vehicle A as an oncoming vehicle ("No" in S21), the output control part 125 returns to S21.

If the other vehicle B is approaching the vehicle A as an oncoming vehicle ("Yes" in S21), the output control part 125 determines whether or not the state of the brake of the vehicle A is off (S22). If the state of the brake of the vehicle A is on ("No" in S22), the output control part 125 returns to S21.

If the state of the brake of the vehicle A is off ("Yes" in S22), the output control part 125 determines whether or not the accelerator opening degree of the vehicle A is greater than the predetermined opening (S23). For example, the output control part 125 determines whether or not the accelerator opening degree of the vehicle A is greater than zero, assuming that the predetermined opening is zero. If the accelerator opening degree is equal to or less than the predetermined opening ("No" in S23), the output control part 125 returns to S21.

If the accelerator opening degree of the vehicle A is greater than the predetermined opening ("Yes" in S23), the output control part 125 determines whether or not the vehicle speed V of the vehicle A is greater than zero (S24). If the vehicle speed V of the vehicle A is zero (i.e., the vehicle A is stopped) ("No" in S24), the output control part 125 returns to S21.

If the vehicle speed V is greater than zero ("Yes" in S24), the output control part 125 determines whether or not the yaw rate of the vehicle A is equal to or greater than the predetermined angular velocity (S25). When the yaw rate of the vehicle A is less than the predetermined angular velocity ("No" in S25), the output control part 125 determines that the vehicle A is not turning right, and returns to S21.

If the yaw rate is equal to or greater than the predetermined angular velocity ("Yes" in S25), the output control part 125 determines that the vehicle A has started to turn right in a situation where the other vehicle B is approaching the vehicle A as an oncoming vehicle, and then causes a warning to be output (S26).

[Effects of the Warning Device 1 According to the Embodiment]

As described above, the warning device 1 according to the embodiment acquires a state of the turn signal 4 of the vehicle A, the vehicle speed V of the vehicle A, the position RBPA of the vehicle A, the azimuth angle of the vehicle A, and the yaw rate of the vehicle A, and acquires the position PB and azimuth angle of the other vehicle B via the vehicle-to-vehicle communication. Next, the warning device 1 determines that the vehicle A will turn right if the turn signal 4 is in the right turn signal state, and the vehicle speed V is equal to or less than the creep speed M. Subsequently, if the vehicle A will turn right, the warning device 1 determines that the other vehicle B is approaching the vehicle A as an oncoming vehicle when i) the vehicle travel vector RA generated from the position PA of the vehicle A to the right relative to the vehicle direction LA indicated by the azimuth angle of the vehicle A and ii) the other vehicle travel vector RB starting from the position PB of the other vehicle B along the other vehicle direction LB indicated by the azimuth angle of the other vehicle B intersect with each other, and the position PB of the other vehicle B is included in the predetermined angle range E. The warning device 1 causes a warning to be output if the other vehicle B is approaching the vehicle A as an oncoming vehicle and the yaw rate of the vehicle A is equal to or greater than the predetermined angular velocity.

Thus, the warning device 1 can output a warning in a situation that necessitates a warning, where the vehicle A starts to turn right when the other vehicle B is approaching the vehicle A as an oncoming vehicle. This allows the warning device 1 to alert the driver of the vehicle A, thereby enhancing the safety of the vehicle A. On the other hand, the warning device 1 does not output a warning if the vehicle A will not turn right or if the other vehicle B is not approaching as an oncoming vehicle. Further, the warning device 1 does not output a warning if the vehicle A has not started to turn right. As a result, since the warning device 1 does not output a warning in a situation that does not necessitate a warning, it is possible to reduce false warnings.

In the above-described embodiment, a case where vehicles travel on the left on a road separated by the center, so-called left-hand traffic, has been described. The present disclosure is not limited to this, and can also be applied to so-called right-hand traffic, where vehicles travel on the right on a road separated by the center. In this case, the right turn determining part according to the embodiment functions as a left turn determining part, and determines that a vehicle will turn left if a turn signal is in a left turn signal state and the vehicle speed is equal to or less than the creep speed. If it is determined that the vehicle will turn left, the oncoming vehicle approach determining part generates a vehicle travel vector from a position of the vehicle to the left relative to a direction indicated by an azimuth angle of the vehicle. Due to this, the warning device 1 can output a warning in a situation that necessitates a warning, where the vehicle A starts to turn left when the other vehicle B is approaching the vehicle A as an oncoming vehicle.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS

1 warning device
2 various sensors
3 communication part
4 turn signal
10 warning output part
11 storage part
12 control part
121 vehicle information acquiring part
122 right turn determining part
123 other vehicle information acquiring part
124 oncoming vehicle approach determining part
125 output control part

The invention claimed is:

1. A warning device comprising:

a sensor group that detects vehicle speed of a vehicle, a position of the vehicle, an azimuth angle of the vehicle, and a yaw rate of the vehicle;

a wireless communication module that receives vehicle speed, a position and an azimuth angle of another vehicle via vehicle-to-vehicle communication;

a memory storing executable instructions that, in response to execution, cause a processor to perform operations, comprising:

(A) acquiring, from a turn signal of the vehicle, a state of the turn signal;

(B) determining that the vehicle will turn right when the turn signal is in a right turn signal state and the vehicle speed of the vehicle is equal to or less than a creep speed;

(C) when it is determined that the vehicle will turn right, generating, starting from the position of the vehicle, a vehicle travel vector to the right relative to a direction indicated by the azimuth angle of the vehicle, and when it is determined that the vehicle will not turn right, not generating the vehicle travel vector, and (D) when the vehicle travel vector and another vehicle travel vector, which starts from the position of the other vehicle along a direction indicated by the azimuth angle of the other vehicle and has a length corresponding to the vehicle speed of the other vehicle, intersect with each other, and the position of the other vehicle falls within a predetermined angle range including the direction indicated by the azimuth angle of the vehicle, determining that the other vehicle is approaching the vehicle as an oncoming vehicle; and a speaker that outputs a warning when it is determined that the other vehicle is approaching the vehicle; and if the yaw rate of the vehicle is equal to or greater than a predetermined angular velocity.

2. The warning device according to claim 1, wherein the processor performs further operations comprising: acquiring a state of a shift lever of the vehicle, and determining that the vehicle will turn right if:

the turn signal is in the right turn signal state;

the vehicle speed is equal to or less than the creep speed; and the shift lever has been kept in a drive position from before the turn signal enters the right turn signal state and the vehicle speed becomes equal to or less than the creep speed.

3. The warning device according to claim 1, wherein the processor determines that the vehicle will turn right if:

the turn signal is in the right turn signal state;

the vehicle speed is equal to or less than the creep speed; and a predetermined time period has not passed since the vehicle speed became equal to or less than predetermined vehicle speed smaller than the creep speed.

4. The warning device according to claim 1, wherein the processor determines that the vehicle will not turn right if:

the turn signal was in the left turn signal state, or the turn signal was in an emergency flashing state, before the turn signal entered the right turn signal state and the vehicle speed became equal to or less than the creep speed, even if the turn signal is in the right turn signal state and the vehicle speed is equal to or less than the creep speed.

5. The warning device according to claim 1, wherein the processor performs further operations comprising acquiring an accelerator opening degree of the vehicle, and outputting the warning when the determination that the other vehicle is approaching the vehicle, if the accelerator opening degree of the vehicle is greater than predetermined opening and if the yaw rate is equal to or greater than the predetermined angular velocity.

6. The warning device according to claim 5, wherein the processor performs further operations comprising acquiring a state of a brake of the vehicle, and outputting the warning when the determination that the other vehicle is approaching the vehicle, the brake is turned on, the vehicle speed becomes zero, and then the brake is turned off, the accelerator opening degree of the vehicle is greater than the predetermined opening, and the yaw rate becomes equal to or greater than the predetermined angular velocity.

7. The warning device according to claim 1, wherein the processor performs further operations comprising:

generating the vehicle travel vector to the right relative to the direction of the vehicle indicated by an average value of a plurality of azimuth angles of the vehicle acquired immediately before; and generating the other vehicle travel vector along the direction of the other vehicle indicated by an average value of a plurality of azimuth angles of the other vehicle acquired immediately before.

8. The warning device according to claim 1, wherein:

the sensor group detects accuracy of the position of the vehicle and accuracy of the azimuth angle of the vehicle, the wireless communication module acquires accuracy of the position of the other vehicle and accuracy of the azimuth angle of the other vehicle, and the processor determines whether or not the other vehicle is approaching the vehicle if the accuracy of the position of the vehicle and the accuracy of the position of the other vehicle are equal to or greater than a position accuracy determination threshold, and if the accuracy of the azimuth angle of the vehicle and the accuracy of the azimuth angle of the other vehicle are equal to or greater than an azimuth angle accuracy determination threshold.

9. A warning device comprising:

a sensor group that detects vehicle speed of a vehicle, a position of the vehicle, an azimuth angle of the vehicle, and a yaw rate of the vehicle;

a wireless communication module that receives vehicle speed, a position and an azimuth angle of another vehicle via vehicle-to-vehicle communication;

a memory storing executable instructions that, in response to execution, cause a processor to perform operations, comprising:

(A) acquiring, from a turn signal of the vehicle, a state of the turn signal;

(B) determining that the vehicle will turn left when the turn signal is in a left turn signal state and the vehicle speed of the vehicle is equal to or less than a creep speed;

(C) when it is determined that the vehicle will turn left, generating, starting from the position of the vehicle, a vehicle travel vector to the left relative to a direction indicated by the azimuth angle of the vehicle, and when it is determined that the vehicle will not turn left, not generating the vehicle travel vector, and (D) when the vehicle travel vector and another vehicle travel vector, which starts from the position of the other vehicle along a direction indicated by the azimuth angle of the other vehicle and has a length corresponding to the vehicle speed of the other vehicle, intersect with each other, and the position of the other vehicle falls within a predetermined angle range including the direction indicated by the azimuth angle of the vehicle, determining that the other vehicle is approaching the vehicle as an oncoming vehicle; and a speaker that outputs a warning when it is determined that the other vehicle is approaching the vehicle; and the yaw rate of the vehicle is equal to or greater than a predetermined angular velocity.

10. The warning device according to claim 2, wherein the processor performs further operations comprising continuing determining that the vehicle will turn right if the shift lever has been kept in the drive position after the vehicle speed became equal to or less than the creep speed, and determining that the vehicle will not turn right if a position of the shift lever is shifted to a position different than the drive position.

11. The warning device according to claim 2, wherein after it has been determined that the vehicle will turn right, the processor performs further operations comprising continuing determining that the vehicle will turn right until a predetermined time period passes since a timing when the vehicle speed became equal to or less than the creep speed, and determining that the vehicle will not turn right if the predetermined time period passes without the vehicle turning right.

12. The warning device according to claim 1, wherein the processor performs further operations comprising determining whether or not the vehicle travel vector and the other vehicle travel vector intersect with each other if the direction indicated by the azimuth angle of the other vehicle and the direction indicated by the azimuth angle of the vehicle are opposite to each other.

13. The warning device according to claim 1, wherein the processor performs further operations comprising determining whether or not the vehicle travel vector and the other vehicle travel vector intersect with each other if the position of the other vehicle is included in a predetermined angle range including the direction indicated by the azimuth angle of the vehicle.

14. The warning device according to claim 9, wherein the processor performs further operations comprising acquiring a state of a shift lever of the vehicle, and determining that the vehicle will turn left if:

the turn signal is in the left turn signal state;

the vehicle speed is equal to or less than the creep speed; and the shift lever has been kept in a drive position from before the turn signal entered the left turn signal state and the vehicle speed became equal to or less than the creep speed.

15. The warning device according to claim 14, wherein the processor performs further operations comprising continuing determining that the vehicle will turn left if the shift lever has been kept in the drive position after the vehicle speed became equal to or less than the creep speed, and determining that the vehicle will not turn left if a position of the shift lever is shifted to a position different than the drive position.

16. The warning device according to claim 14, wherein after it has been determined that the vehicle will turn left, the processor performs further operations comprising continuing determining that the vehicle will turn left until a predetermined time period passes since a timing when the vehicle speed became equal to or less than the creep speed, and the determining that the vehicle will not turn left if the predetermined time period has passed without the vehicle turning left.

17. The warning device according to claim 9, wherein the processor performs further operations comprising determining whether or not the vehicle travel vector and the other vehicle travel vector intersect with each other if the direction indicated by the azimuth angle of the other vehicle and the direction indicated by the azimuth angle of the vehicle are opposite to each other.

18. The warning device according to claim 9, wherein the processor performs further operations comprising determining whether or not the vehicle travel vector and the other vehicle travel vector intersect with each other if the position of the other vehicle is included in a predetermined angle range including the direction indicated by the azimuth angle of the vehicle.

19. The warning device according to claim 1, wherein the predetermined angle range is set starting from the position of the vehicle and is a range that combines a first angle range from an angle indicating the direction between the vehicle heading indicated by the azimuth angle of the vehicle and the vehicle travel vector to the vehicle heading, and a specified second angle range set on the opposite side of the first angle range across the vehicle heading.

20. The warning device according to claim 9, wherein the predetermined angle range is set starting from the position of the vehicle and is a range that combines a first angle range from an angle indicating the direction between the vehicle heading indicated by the azimuth angle of the vehicle and the vehicle travel vector to the vehicle heading, and a specified second angle range set on the opposite side of the first angle range across the vehicle heading.

* * * * *